US005485161A

United States Patent [19]
Vaughn

[11] Patent Number: 5,485,161
[45] Date of Patent: Jan. 16, 1996

[54] VEHICLE SPEED CONTROL BASED ON GPS/MAP MATCHING OF POSTED SPEEDS

[75] Inventor: David Vaughn, San Jose, Calif.

[73] Assignee: Trimble Navigation Limited, Sunnyvale, Calif.

[21] Appl. No.: 325,130

[22] Filed: Nov. 21, 1994

[51] Int. Cl.$^6$ .............................. H04B 7/185; G01S 5/02

[52] U.S. Cl. .......................... 342/357; 342/457; 364/449; 364/440

[58] Field of Search .................................. 342/357, 457; 364/449, 440

[56] References Cited

U.S. PATENT DOCUMENTS

| | | | |
|---|---|---|---|
| 4,651,157 | 3/1987 | Gray et al. | 342/457 |
| 4,814,711 | 3/1989 | Olsen et al. | 342/357 |
| 4,818,107 | 4/1989 | Ono et al. | 356/375 |
| 5,179,519 | 1/1993 | Adachi et al. | 364/449 |
| 5,270,708 | 12/1993 | Kamishima | 340/995 |
| 5,311,173 | 5/1994 | Komura et al. | 364/449 |
| 5,343,780 | 9/1994 | McDaniel et al. | 477/108 |

*Primary Examiner*—Theodore M. Blum
*Attorney, Agent, or Firm*—Boris G. Tankhilevich

[57] ABSTRACT

The GPS-map speed matching system for controlling the speed of the vehicle is described. The system includes a GPS navigation receiver, a database processing facility, a GPS computer, an engine computer, a video display, a speed sensor and a heading sensor. The database processing facility can be local or remote. The GPS computer obtains the latitude, longitude, heading and speed of the vehicle. The database processing facility processes the GPS data and obtains the location and the maximum posted speed of the vehicle. The GPS computer or an engine computer perform the comparison between the vehicle speed and the maximum posted speed and signal the odometer to decrease the vehicle speed if the vehicle speed exceeds the maximum posted speed plus some predetermined value.

26 Claims, 3 Drawing Sheets

VEHICLE SPEED CONTROL BASED ON GPS/MAP MATCHING OF POSTED SPEEDS

BACKGROUND

When a vehicle travels the road with the posted speed limit, it is often appropriate to monitor adherence by the vehicle to the posted maximum speed. The adherence does not have to be a strict one. It is sufficient for the vehicle to travel within five-ten miles/hour of the posted maximum speed. Usually the maximum posted speed is enforced by the police road patrol.

Monitoring adherence by the vehicle to a route or schedule is well known in the prior art.

Gray in U.S. Pat. No. 4,651,157 discloses a security monitoring and tracking system for a terrestrial or marine vehicle that uses navigational information to determine the latitude and longitude of the vehicle.

U.S. Pat. No. 4,814,711, issued to Olsen, discloses a survey system for collection of real time data from a plurality of survey vehicles, each of which determines its present location using global positioning system (GPS) signals received from a plurality of GPS satellites. A central station periodically polls each survey vehicle and receives that survey vehicle's present location coordinates by radio wave communication. The central station compares that vehicle's path with a survey pattern assigned to that vehicle. The geophysical data measured by a vehicle are also received by the central station and are coordinated with that vehicle's location at the time it was taken.

Harker discloses in U.S. Pat. No. 5,177,684 a method for analyzing transportation schedules of a transportation vehicle to produce optimized schedules. The method uses information on the vehicle's assigned path and the average speed and mobility of the vehicle, and determines a realistic, optimum schedule, including arrival and departure times, that the vehicle can adhere to along that path.

U.S. Pat. No. 5,243,530 issued to Stanifer discloses a system for tracking a plurality of terrestrial, marine or airborne vehicles, using a local area network and packet communication of location information. Loran-C signals are received by a receiver/processor/transmitter on a vehicle, the vehicle's present location is determined, and this location information is transmitted to a central station, using LAN packet protocols, acknowledgment signals and backoff/retransmission procedures that are standard in the LAN art. If a given vehicle's present location is not received by the central station within a time interval of selected length, the central station requests transmission of the present location from that vehicle.

What is needed is an approach that allows one to automatically match the vehicle's speed with the maximum posted speed and to control the vehicle's speed if it substantially exceeds the posted limit. It would allow enforcement of the vehicle's maximum speed without the police patrol or with reduced police patrol, which is of interest to owners of fleets of vehicles, such as trucking companies. Such compliance would save the fleet owners money.

SUMMARY

The present invention is unique because it allows one to control the vehicle speed by using the Global Positioning System to determine the vehicle location, and to use locally stored map database to match the vehicle location and speed with the maximum posted speed limit. Accordingly, the speed of the vehicle is controlled and the posted speed is enforced without using the police patrol.

One aspect of the present invention is directed to an apparatus for controlling the maximum speed of a vehicle based on the speed limits posted on the street on which the vehicle is travelling. The apparatus includes a GPS navigation computer and receiver with an earth navigation format data output, a vehicle engine computer connected to said navigation computer, and a map database. The GPS navigation computer includes a GPS associated memory unit. The GPS navigation computer includes a port for downloading map data from the map database into the memory unit for original installation and for updating and changes. The GPS navigation computer determines location and speed of the vehicle, inputs the maximum speed from the map database, and forwards the speed limit to the engine computer, wherein the engine computer uses the speed limit information contained in the map database to limit the maximum ground speed of the vehicle. The apparatus further includes a vehicle display of an electronic map connected to the GPS computer for electronically displaying the map with the posted speed limit, the current location of the vehicle on the map and the current speed of the vehicle.

The apparatus further includes a speed sensor and a heading sensor. These sensors are connected to the vehicle odometer for reading speed and heading of the vehicle and to the GPS computer and to the vehicle engine computer for transmitting the reading of speed and heading of the vehicle. The vehicle engine computer further includes an engine computer memory and an engine microprocessor, wherein said vehicle engine computer is connected to the GPS computer to receive the value of the maximum map speed limit from the map data.

In one embodiment the engine computer memory contains a predetermined speed value which is added to the maximum speed map limit to obtain the real maximum speed value of the vehicle. The vehicle engine computer is connected to the vehicle odometer to control the real maximum speed value of the vehicle.

In another embodiment the GPS memory unit contains a predetermined speed value which is added to the maximum speed map limit to obtain the real maximum speed value of the vehicle. The GPS computer is connected to the vehicle engine computer to control the real maximum speed value of the vehicle.

In one embodiment the map database includes a local database processing facility connected to the port by a hard wired connection for downloading map data from one particular database. It is connected to the GPS computer by a hard wired connection for receiving longitude, latitude, speed and bearing of the vehicle. The database processing facility comprises a plurality of specialized databases that include relational data expressed in earth navigation format, an indexer connected to specialized databases for selecting access to a particular database according to the position descriptor related in this particular database to the vehicle location, wherein the vehicle location and speed are determined by the GPS computer and are transmitted to the database processing facility. The plurality of specialized databases further includes data for relational access that is in a latitude and longitude format.

In another embodiment the database processing facility includes a remote database processing facility. In this embodiment, the GPS computer further includes a GPS transmitting means for a wireless transmission of the position, speed and bearing data of the vehicle to the remote database processing facility. The remote database processing facility further comprises a receiving means for wireless reception of the vehicle position, speed and bearing data, and a transmitting means for a wireless transmission of the map data corresponding to the position, speed and bearing data of the vehicle to the GPS computer. The GPS computer further comprises a GPS receiving means for wireless reception the map data from the remote database processing facility and for downloading the map data to the download port.

The wireless transmission and reception of the map data can be performed by using the analog cellular phone, a cellular digital phone, a satellite link, wherein the satellite link includes a Trimble Galaxy system which uses the Inmarsat Satellite system, or a Specialized Mobile Radio system (SMR).

Another aspect of the present invention is directed to the use of a wireless link for reporting the location, speed and the maximum posted speed of the vehicle to the pertinent customer service organization.

One more aspect of the present invention is directed to a method for controlling the maximum speed of a vehicle based on the speed limits posted on the street on which the vehicle is travelling using a remote database processing facility. The method comprises the steps of: (1) determining the position, speed and bearing data of the vehicle by using the GPS computer; (2) transmitting the position, speed and bearing data of the vehicle to the remote database processing facility by using said GPS transmitting means; (3) receiving the vehicle position, speed and bearing data by the remote database processing facility employing said receiving means; (4) processing the position, speed and bearing data by the remote database processing facility to obtain the map location of the vehicle; (5) determining the map data including the maximum speed corresponding to the location of the vehicle by the processing facility; (6) transmitting the map and vehicle data corresponding to the position, speed and bearing data of the vehicle by the transmitting means of the database processing facility; (7) receiving the map and vehicle data including the maximum speed for the vehicle location from the remote database processing facility by the GPS receiving means; (8) downloading the map data to the download port; (9) determining what street the vehicle is on and what is the maximum speed limit for that street; (10) forwarding the maximum speed limit to the engine computer by the GPS computer; (11) using the speed limit information contained in the map database by said engine computer to limit the maximum ground speed of the vehicle; and (12) reporting the location, speed of the vehicle and the maximum posted speed to the customer service organization by using the GPS transmitting means.

Yet one more aspect of the present invention is directed to a method for controlling the maximum speed of a vehicle based on the speed limits posted on the street on which the vehicle is travelling using a local database processing facility. The method comprises the steps of: (1) determining the position, speed and bearing data of the vehicle by using said GPS computer; (2) transmitting the position, speed and bearing data of the vehicle to the local database processing facility; (3) processing the position, speed and bearing data by the local database processing facility to obtain the map location of the vehicle; (4) determining the map data including the maximum speed corresponding to the location of the vehicle by the local processing facility; (5) downloading the map and vehicle data to the download port; (6) storing the map and vehicle data in the memory unit including speed of the vehicle, what street the vehicle is on and what is the maximum speed limit for that street; (7) forwarding the maximum speed limit to the engine computer by the GPS computer; (8) using the map data by said engine computer to limit the maximum ground speed of the vehicle; and (9) reporting the vehicle speed, location and maximum posted speed to the customer service organization using said GPS transmitting means.

DETAILED DESCRIPTION OF THE PREFERRED EMBODIMENT.

Figure 1:
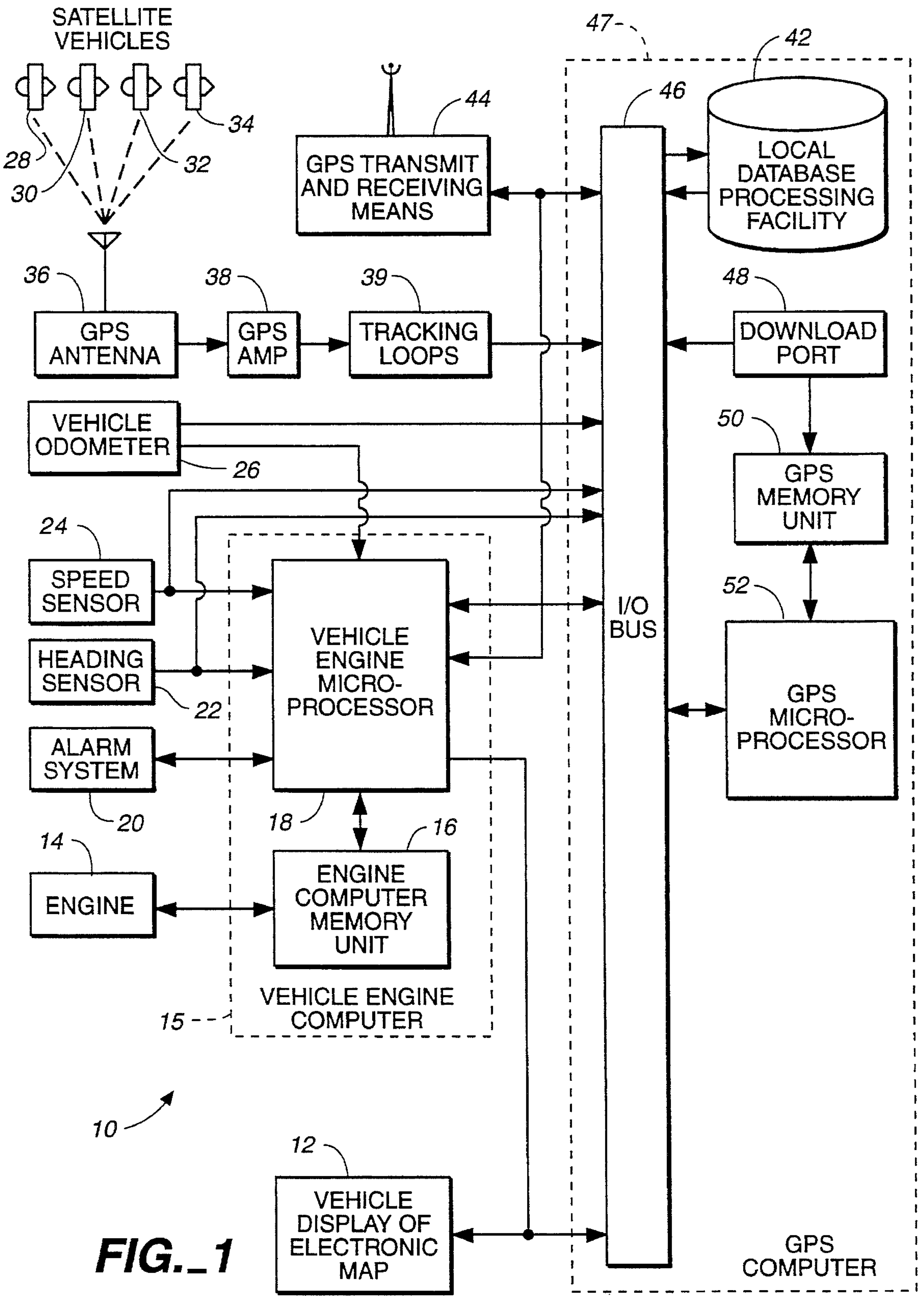
FIG. 1 illustrates a functional diagram of a GPS-map speed matching vehicle.

FIG. 1 illustrates a GPS-map speed matching vehicle with a local database processing facility embodiment of the present invention, referred to herein by the general reference numeral 10. System 10 includes a global positioning system (GPS) navigation receiver 38 including a GPS antenna 36. In the preferred embodiment, the GPS antenna 36 is able to receive the satellite signals from at least four satellite-vehicles 28, 30, 32 and 34. These four satellites are part of the GPS.

The GPS is a system of satellite signal transmitters, with receivers located on the Earth's surface or starting near to the Earth's surface compared to the orbit altitude of the GPS satellite, that transmits information from which an observer's present location and/or the time of observation can be determined. There is also the Global Orbiting Navigational System (GLONASS), which operates as an alternative GPS system.

The Global Positioning System (GPS) is part of a satellite-based navigation system developed by the United States Defense Department under its NAVSTAR satellite program. A fully operational GPS includes up to 24 Earth satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency $f1=1575.42$ MHz and an L2 signal having a frequency $f2=1227.6$ MHz. These two frequencies are integral multiples $f1=1540\ f0$ and $f2=1200\ f0$ of a base frequency $f0=1.023$ MHz. The L1 signal from each satellite is binary phase shift key (BPSK) modulated by two pseudo-random noise (PRN) codes in phase quadrature, designated as the C/A-code and P(Y)-code. The L2 signal from each satellite is BPSK modulated by only the P(Y)-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay~$f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can also be determined.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P(Y)-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P(Y)-code, and is a relatively short, coarser-grained code having a clock or chip rate of f0=1.023 MHz. The C/A -code for any GPS satellite has a length of 1023 chips or time increments before this code repeats. The full P(Y)-code has a length of 259 days, with each satellite transmitting a unique portion of the full P(Y)-code. The portion of P(Y)-code used for a given GPS satellite has a length of precisely one week (7.000 days) before this code portion repeats. Accepted methods for generating the C/A-code and P(Y)-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeries of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System,* Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1= (1.602+9k/16) GHz and f2=(1.246+7k/16) GHz, where k (=0,1,2, . . . 23) is the channel or satellite number. These frequencies lie in two bands at 1.597–1.617 GHz (L1) and 1,240–1,260 GHz (L2). The L1 code is modeled by a C/A-code (chip rate=0.511 MHz) and by a P(Y)-code (chip rate=5.11 MHz). The L2 code is presently modeled only by the P(Y)-code. The GLONASS satellites also transmit navigational data at a rate of 50 Baud. Because the channel frequencies are distinguishable from each other, the P(Y)-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few millimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

A SATPS antenna receives SATPS signals from a plurality (preferably four or more) of SATPS satellites and passes these signals to a SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemeries for each identified SATPS satellite. The SATPS signal antenna and signal receiver/processor are part of the user segment of a particular SATPS, the Global Positioning System, as discussed by Tom Logsdon, op cit, p 33–90.

There are several major components in a typical GPS (SATPS) receiver. The GPS (SATPS) antenna 36 is designed to pick up the right-hand circular-polarized L1 and/or L2 carrier waves from selected satellites located above the horizon. The amplifying circuit 38 concentrates and amplifies the modulated carrier waves, and converts the wave electromagnetic energy into an equivalent electric current still containing the appropriate C/A-code, P(Y)-code, and data stream modulations.

Two different types of tracking loops 39 are used by a SATPS (GPS) receiver. The code-tracking loop tracks the C/A-code and/or P(Y)-code pulse trains to obtain the signal travel time for each relevant satellite.

The phase-lock loop tracks the satellite's carrier wave phase to obtain its carrier phase. Code-tracking allows the receiver to measure the appropriate pseudoranges to at least four satellites necessary for accurate positioning solutions. Carrier phase tracking allows the receiver to measure the corresponding carrier phase so the receiver can estimate more accurate values for the receiver's pseudorange and the three mutually orthogonal velocity components.

In general, GPS receivers can be either one of two types, authorized or unauthorized. The authorized GPS receivers are able to receive and decode a second carrier channel L2 from the orbiting GPS satellites that carries precision code (P(Y)-code) data which must be decrypted with a special military decryption device. When selective availability (SA) is engaged by the government, the position accuracy of unauthorized GPS receivers is degraded because such receivers are able to only use the coarse acquisition (C/A) code available on the primary carrier channel (L1), and that data is deliberately dithered during SA. Position solutions which are computed therefore become randomly skewed over time in heading and distance from the perfect solution.

In the preferred embodiment, the GPS-map speed matching vehicle system includes two computers, a GPS computer 47 and an engine computer 15. The GPS computer includes a GPS microprocessor 52, a GPS memory unit 50 with a port for data downloading 48, and an input/output bus 46. The engine computer 15 comprises a vehicle engine microprocessor 18 and an engine computer memory 16.

The GPS computer 47 uses the pseudorange and the carrier phase measurements to determine the instantaneous position coordinates and the instantaneous velocity components of the GPS receiver. The GPS memory unit 50 provides erasable storage for the various Pipes of computations. Each time used to obtain the first estimates of position and to determine which four satellites are most favorably positioned for accurate navigation.

The GPS receiver-computer can be a conventional instrument which is commercially available, e.g., the SCOUT marketed by Trimble Navigation (Sunnyvale, Calif.).

A local database processing facility 42 illustrated in FIG. 1 receives the latitude, longitude, bearing information and speed from GPS microprocessor 52 and uses that data to index a plurality of databases, e.g., street, landmark, intersection and jurisdiction databases. For instance, the street name, block address, city, zip code and jurisdictional information are related to latitude and longitude information for every significant street in an operational region. Streets are also arranged in a hierarchy, such as freeways, highways, side streets and alleyways.

Street intersections are also database related to their respective latitudes and longitudes. Street bearings, e.g., north-south, are also stored to provide a bearing constraint to improve navigation solution accuracies.

Figure 3:
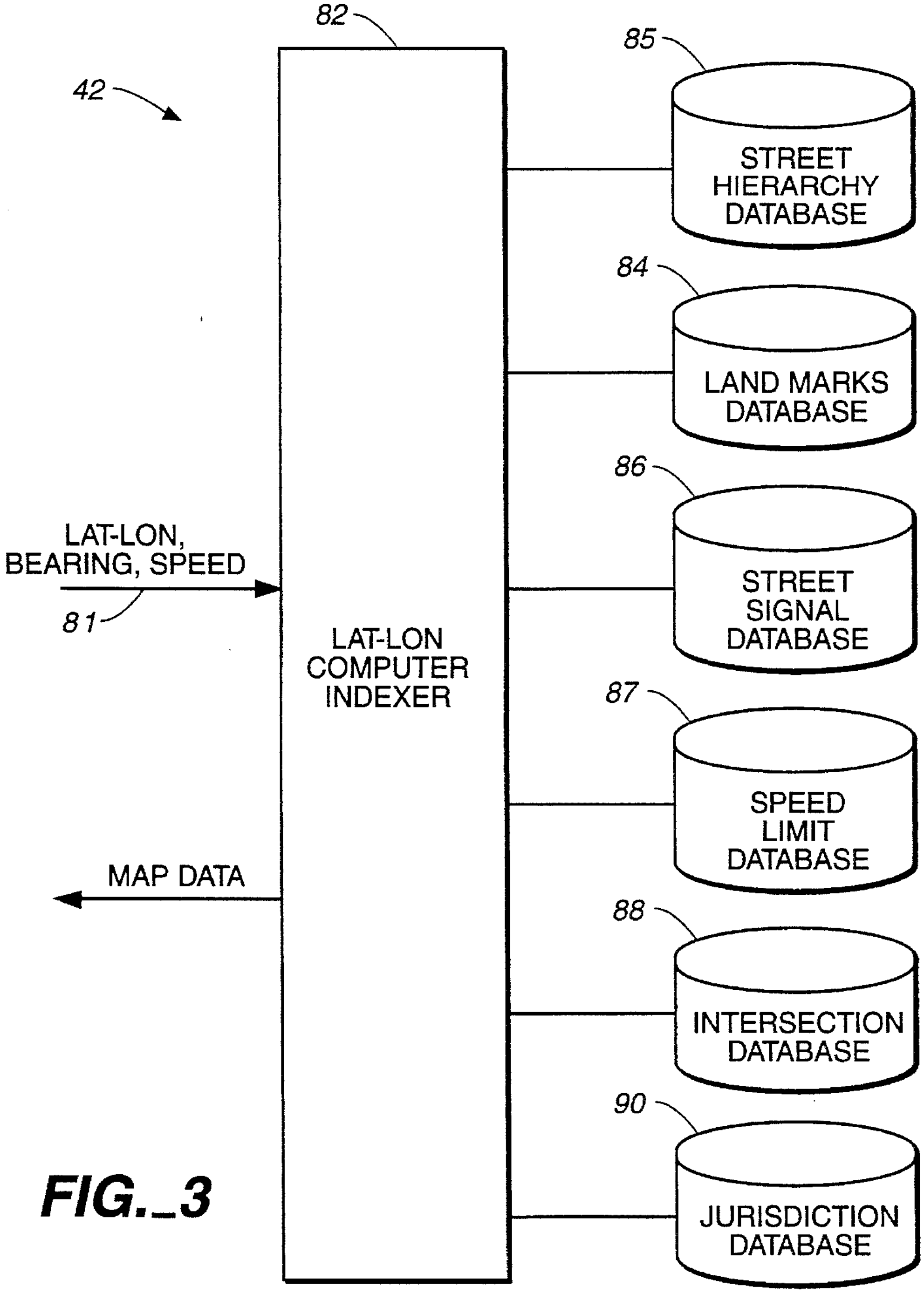
FIG. 3 shows a functional diagram of the database processing facility.

FIG. 3 depicts a functional diagram of a database processing facility 42. Latitude, longitude, bearing and speed information 81 from the GPS microprocessor 52 are provided to the computer indexer 82. The function of the database processing facility 80 is to convert latitude and longitude data to street address format with the maximum posted speed, e.g. "509 Civic Drive, Concord, Calif., maximum speed is 45 miles/hour", or "Eastbound on 509 Civic Drive, Concord, Calif., maximum speed is 45 miles/hour", if bearing information is included.

A plurality of discrete databases, represented by landmarks database 84, street hierarchy database 85, street segment database 86, speed limit database 87, intersection database 88, and jurisdiction database 90, are selectively accessed by indexer 82. Indexer 82 may be implemented with a personal computer system having a disk operating system (DOS) and one or more hard disk drives for storage of the databases 84–90. In another embodiment, a plurality of CD-ROMs may be used for storage of databases 84–90. In yet one more embodiment the local database processing facility 42 may be implemented by using GPS memory unit 50 and GPS microprocessor 52. Commercial hardware and software, including relational database software and street map information in digital form, are readily available and conventional. For instance, ETAK sells the speed limit data on a map database.

Database 85 is a street hierarchy database wherein the latitudes and longitudes of various continuous streets within a region are related to classes of streets, e.g., by size, such as freeway, highway, side street or alleyway. Latitude, longitude and bearing information provided in real-time are used relational to obtain the name of a street at an appropriate classification level.

Database 86 is a street segment database wherein the latitudes and longitudes of various continuous streets within a region are relational related to street names, block addresses and bearings.

Database 88 is a street intersection database that includes relational data for each intersection of a street with another street in a regional geographic area and the earth navigation locations of such intersection and the corresponding common street names.

Database 84 is a landmarks database that includes relational data for each landmark in a regional geographic area and the earth navigation locations of such landmarks and their corresponding common street addresses or common location descriptors. Examples of such landmarks are the Stanford University, the Golden Gate Park, Mount Diablo, etc.

Many other specialized databases can be included in the database processing facility 80 for use in a particular application. For example, a jurisdictional database 90 can be included for reporting the unreasonable speed of the vehicle to the local police. Differential correction information can be also stored in database processing facility 42 and used to correct the position fixes received. This then permits meter-level position determination accuracies, as may be required to settle jurisdictional ambiguities.

After the location of the vehicle is determined, the computer indexer accesses the speed limit database 87 to determine the maximum posted speed for the vehicle location. The obtained data is transmitted by the database processing facility to the vehicle computers.

The local database facility 42 provides the map information including location, speed of the vehicle and the maximum posted speed to the GPS computer 47 or alternatively to the engine computer 15.

In one embodiment the map data from the database processing facility is downloaded to the port 48 and is stored in the memory unit 50. The memory unit also keeps some predetermined speed value which is added to the maximum posted speed before the comparison with the vehicle speed is made. If the vehicle speed exceeds the maximum posted speed plus the predetermined speed value, the GPS computer connected to an odometer 26 transmits the signal to the odometer to decrease the vehicle speed. The reading of the vehicle speed and heading can be also obtained by the use of speed sensor 24 and heading sensor 22 connected to the vehicle odometer 26 and to the GPS computer 47.

In another embodiment the map data from the facility 42 is transmitted to the vehicle engine computer 15, wherein the microprocessor 18 makes the comparison between the vehicle speed and the maximum posted speed plus some predetermined value. If this is the case, the vehicle computer 15 transmits the operational signal to the engine computer 26 to decrease the vehicle speed. The vehicle computer can also obtain the speed and heading reading of the vehicle by using the speed sensor 24 and heading sensor 22.

The location of the vehicle, its current speed and maximum posted speed can be displayed on the electronic map. The control display module 12 is a convenient man-machine interface between the user, the GPS receiver, and the database processing facility. The current position and velocity are automatically displayed on light-emitting diodes (LEDs), liquid crystal display (LCD), or cathode ray tube (video) screens. The control display unit also displays the exact time and waypoint navigation instructions under efficient user control, as discussed by Tom Logsdon, op cit, p 49–52. The display 12 is connected to the GPS computer 47 and to the engine computer 15. Accordingly, the location, current speed of the vehicle and the maximum posted speed is displayed on the electronic map.

The location and speed of the vehicle can be reported to the customer organization and to the law enforcement organization by using a GPS transmitting means 44. The wireless communication between the vehicle and the remote location is discussed in detail below.

Figure 2:
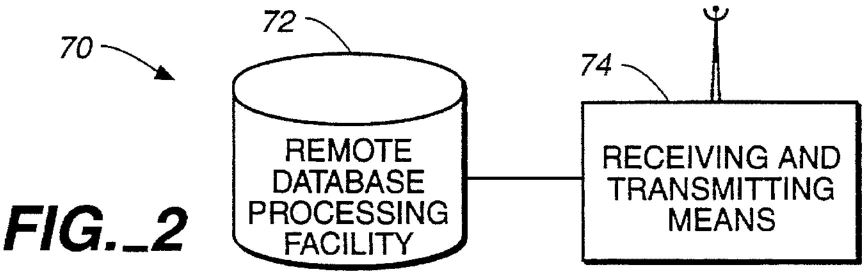
FIG. 2 depicts a remote database processing facility with a wireless link.

In another preferred embodiment a database processing facility 70 as shown in FIG. 2 is a remote database processing facility 72 including a receiving and transmitting means 74. In this embodiment, to communicate with the remote database processing facility, the vehicle GPS-map speed matching system includes a GPS transmitting and receiving means 44 as depicted in FIG. 1. It is well known to the ordinary person skilled in the art how to implement the receiving and transmitting means 74 and 44. The remote processing facility 72 has the same functional representation as the local database processing facility illustrated in FIG. 3. Accordingly, the above detailed discussion of the database processing facility 80 including the computer indexer 82 and a plurality of databases 84–90 is incorporated herein by reference. (The remote database processing facility can not be implemented using the GPS computer itself.)

The wireless link between the roving vehicle and the remote database processing facility station can be implemented in a variety of different embodiments.

In one embodiment, the wireless link (GPS transmitting and receiving means 44) is provided by using a cellular telephone. Cellular telephones are commercially available, e.g., the DPC-550 marketed by Motorola, CellularOne (Phoenix, Ariz.). The GPS computer provides latitude, longitude and bearing information in modem tone format to a cell station, wherein the cell station is connected to the database processing facility by a landline. The processed map data from the remote database facility is sent back to the roving vehicle using the same landline and the same or different cell. The cellular wireless communication between the roving vehicle and the database processing facility can be analog or digital as well.

The map data received by the GPS receiving means 44 can be transmitted to the GPS computer 47 or to the vehicle engine computer 15. See discussion above.

The wireless link can be also implemented by using a satellite link. The satellite can be implemented by using the Trimble Galaxy system which uses the Inmarsat Satellite system and is produced by the Trimble Navigation Inc., Sunnyvale, Calif. The wireless can be also realized by using a Specialized Mobile Radio system (SMR) which is well known to the ordinary person skilled in the art.

The wireless link can be used for reporting the location and speed of the vehicle to the customer and the law enforcement organizations.

Figure 4:
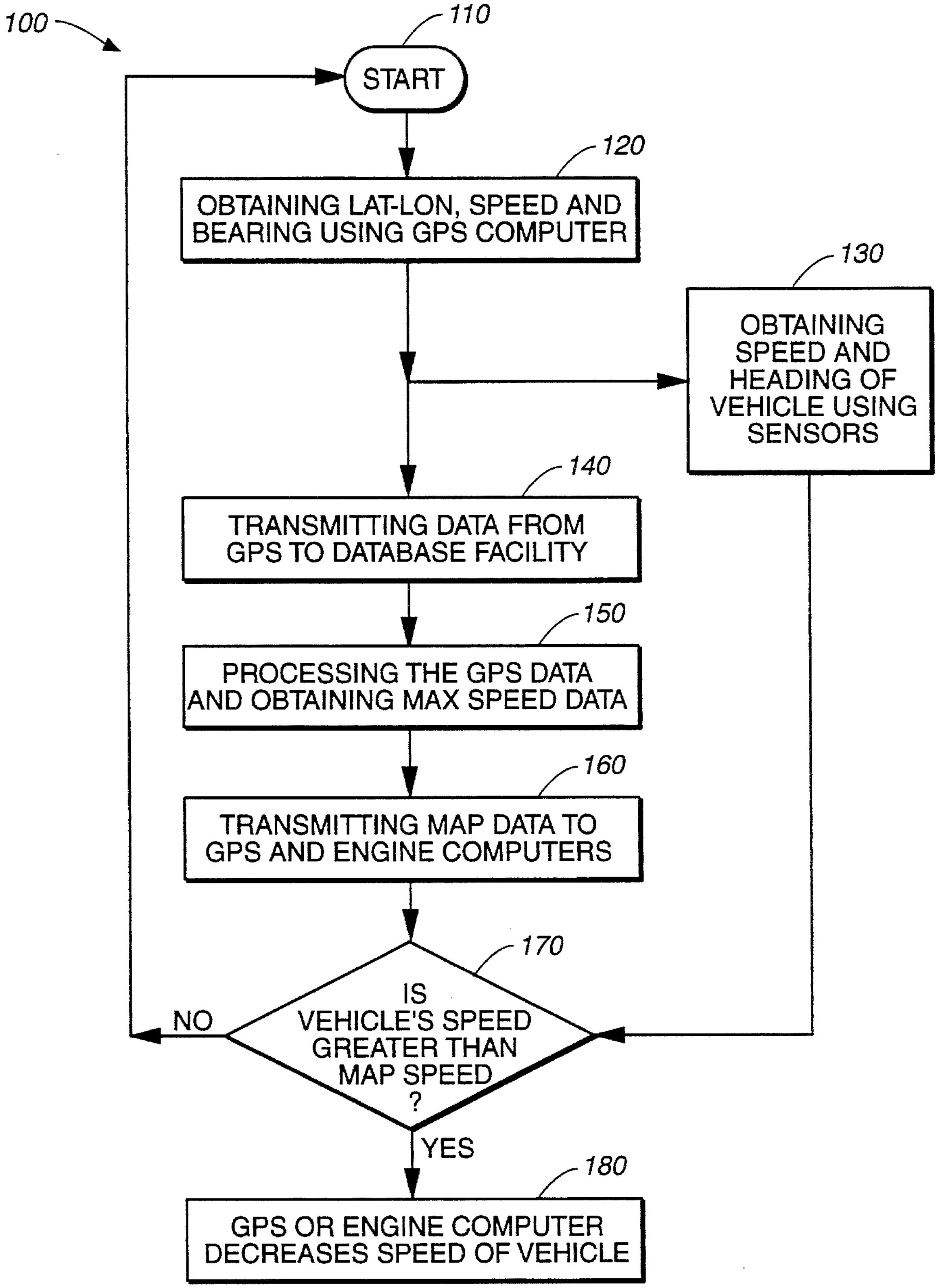
FIG. 4 illustrates a flow chart showing how the GPS-map matching vehicle works.

FIG. 4 depicts a flow chart 100 which is a schematic illustration of different functional steps performed by the present invention.

The first step 120 is performed by the GPS computer 47 (FIG. 1) which obtains the latitude, longitude, speed and bearing of the vehicle. The next step 140 is the transmission of the GPS data to the database processing facility, local 42 (FIG. 1) or remote 70 (FIG. 2). The following step 140 is performed by the database processing facility which converts the GPS latitude, longitude, speed and bearing data into the map location of the vehicle with the posted maximum speed limit. The map data is transmitted by the step 160 back to the GPS computer 47 (FIG. 1) or to the engine computer 15 (FIG. 1). Alternatively, the speed sensor 24 and the heading sensor 22 (FIG. 1 ) transmit the speed and heading of the vehicle to the GPS computer or to the engine computer.

The GPS computer in one embodiment (or the engine computer in another embodiment) in step 170 performs the comparison between the vehicle speed and the maximum posted speed plus some predetermined extra speed value. If the vehicle speed is less than the posted maximum speed plus the extra value, all steps are performed again. The system goes to the start step 110. If the speed of the vehicle exceeds the maximum posted speed plus the extra speed, the GPS computer signals to the engine computer to decrease the vehicle speed—step 180.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for controlling the maximum speed of a vehicle based on the speed limits posted on the street on which the vehicle is travelling, said apparatus comprising:

a position-, bearing- and speed-determining navigation receiver-computer with an earth navigation format data output;

a vehicle engine computer connected to said navigation receiver; and a location-speed relational map database, wherein said location-speed relational map database is stored in said navigation receiver-computer;

wherein said navigation receiver-computer determines the location and the speed of the vehicle, inputs the maximum speed from said location-speed map database, and forwards the speed limit to said engine computer, and wherein said engine computer uses the speed limit information contained in said location-speed map database to limit the maximum ground speed of the vehicle.

2. The apparatus of claim 1, wherein:

said position-, speed- and bearing-determining navigation computer-receiver includes a GPS navigation computer and a GPS receiver.

3. The apparatus of claim 2, wherein:

said GPS navigation computer includes a GPS associated memory unit, said memory unit storing said location-speed map database.

4. The apparatus of claim 2, wherein:

said GPS navigation computer includes a port for downloading said location-speed map database into said memory unit for original installation and for updating and changes.

5. The apparatus of claim 4 further including:

a database processing facility, wherein said database processing facility is connected to said GPS microprocessor and is connected to said port for downloading said location-speed map database.

6. The apparatus of claim 5, wherein:

said database processing facility comprises:

a plurality of specialized databases that include relational data expressed in earth navigation format;

an indexer connected to said specialized databases for selecting access to a particular one of said databases according to the position descriptor related in said database to the vehicle location, wherein the vehicle location is determined by said GPS computer and transmitted to said database processing facility.

7. The apparatus of claim 6, wherein the plurality of specialized databases further includes data for relational access that is in a latitude and longitude format.

8. The apparatus of claim 7, further comprising a speed sensor and a heading sensor, said sensors being connected to the vehicle odometer for reading speed and heading of the vehicle, said sensors being connected to said GPS computer and to said vehicle engine computer for transmitting the reading of speed and heading of the vehicle.

9. The apparatus of claim 8, further comprising a vehicle display of electronic map, wherein said display is connected with said GPS computer for electronically displaying the map with the posted speed limit, the current location of the vehicle on the map and the current speed of the vehicle.

10. The apparatus of claim 9, wherein:

said database processing facility includes a local database processing facility being connected to said port by a hard wired connection for downloading map data from said one particular database, and wherein said local database processing facility is connected to said GPS microprocessor by a hard wired connection for receiving longitude, latitude, speed and bearing of the vehicle.

11. The apparatus of claim 10, wherein:

said vehicle engine computer further includes an engine computer memory and an engine microprocessor;

and wherein said vehicle engine computer is connected to said GPS computer to receive the value of the maximum map speed limit from the map data according to the location of the vehicle;

and wherein said engine compute memory contains a predetermined speed value which is added to the maximum speed map limit to obtain the real maximum speed value of the vehicle;

and wherein said vehicle engine computer is connected to the vehicle odometer to control the real maximum speed value of the vehicle.

12. The apparatus of claim 10, wherein:

said GPS memory unit contains a predetermined speed value which is added to the maximum speed map limit to obtain the real maximum speed value of the vehicle;

and wherein said GPS computer is connected to the vehicle odometer to control the real maximum speed value of the vehicle.

13. The apparatus of claim 9, wherein:

said database processing facility includes a remote database processing facility, and wherein said GPS computer further includes a GPS transmitting means for wireless transmitting the position, speed and bearing data of the vehicle to said remote database processing facility, and wherein said remote database processing facility further comprises a receiving means for a wireless reception of the vehicle position, speed and bearing data, and wherein said remote database processing facility further includes a transmitting means for a wireless transmission of the map data corresponding to the position, speed and bearing data of the vehicle, and wherein said GPS computer further comprises a GPS receiving means for a wireless reception of the map data from said remote database processing facility and for downloading the map data to said download port.

14. The apparatus of claim 13, further comprising an analog cellular phone, wherein said wireless transmission and reception of the map data is performed by using said analog cellular phone.

15. The apparatus of claim 13, further comprising a cellular digital phone, wherein said wireless transmission and reception of the map data is performed by using said digital cellular phone.

16. The apparatus of claim 13, further comprising a satellite link, wherein said wireless transmission and reception of the map data is performed by using said satellite link.

17. The apparatus of claim 16, wherein said satellite link includes a Trimble Galaxy system which uses the Inmarsat Satellite system.

18. The apparatus of claim 13, further comprising a Specialized Mobile Radio system (SMR), wherein said wireless transmission and reception of the map data is performed by using said SMR system.

19. The apparatus of claim 13, wherein:

said vehicle engine computer further includes an engine computer memory and an engine microprocessor;

and wherein said vehicle engine computer is connected to said GPS computer to receive the value of the maximum map speed limit from the map data according to the location of the vehicle;

and wherein said engine computer memory contains a predetermined speed value which is added to the maximum speed map limit to obtain the real maximum speed value of the vehicle;

and wherein said vehicle engine computer is connected to the vehicle odometer to control the real maximum speed value of the vehicle.

20. The apparatus of claim 13, wherein:

said GPS memory unit contains a predetermined speed value which is added to the maximum speed map limit to obtain the real maximum speed value of the vehicle;

and wherein said GPS computer is connected to the vehicle odometer to control the real maximum speed value of the vehicle.

21. An apparatus for controlling the maximum speed of a vehicle based on the speed limits posted on the street on which the vehicle is travelling and for reporting the specification conditions to the pertinent customer service organization, said apparatus comprising:

a GPS navigation computer; wherein said GPS navigation computer includes:

a GPS associated memory unit, and a port for downloading data into said memory unit for original installation and for updating and changes;

a GPS receiver;

a location-speed relational map database, wherein said map database is stored in said GPS memory unit;

a database processing facility, wherein said database processing facility is connected to said GPS microprocessor and is connected to said port for downloading said location-speed relational map database; said database processing facility comprising:

a plurality of specialized databases that include relational data expressed in earth navigation format and data for relational access that is in a latitude and longitude format; and an indexer connected to said specialized databases for selecting access to a particular one of said databases according to the position descriptor related in said database to the vehicle location;

a vehicle engine computer connected to said navigation receiver;

a speed sensor and a heading sensor, said sensors being connected to the vehicle odometer for reading speed and heading of the vehicle, said sensors being connected to said GPS computer and to said vehicle engine computer for transmission of the reading of speed and heading of the vehicle;

a vehicle display of an electronic map, wherein said display is connected with said GPS computer for electronically displaying the map with the posted speed limit, the current location of the vehicle on the map and the current speed of the vehicle;

wherein said database processing facility includes a remote processing facility further comprising a wireless transmitting means and a wireless receiving means;

and wherein said GPS computer further includes a GPS transmitting and receiving means;

and wherein said GPS transmitting means is used for a wireless transmission of the position, speed and bearing data of the vehicle to said remote database processing facility;

and wherein said remote database processing facility employs said receiving means for a wireless reception of the vehicle position, speed and bearing data;

and wherein said remote database processing facility employs said transmitting means for a wireless transmission of the map data corresponding to the position and bearing data of the vehicle;

and wherein said GPS computer is adapted to use said GPS receiving means for a wireless reception of the map data including the maximum speed for the vehicle location from said remote database processing facility and for downloading the map data to said download port for determining what street the vehicle is on and what is the maximum speed limit for that street;

and wherein said GPS computer forwards the maximum speed limit to said engine computer;

and wherein said engine computer uses the speed limit information contained in said map database to limit the maximum ground speed of the vehicle;

and wherein said engine computer or said GPS computer uses said wireless communication link to report the location and speed of the vehicle and the maximum speed limit for the vehicle location to the customer organization.

22. An apparatus for controlling the maximum speed of a vehicle based on the speed limits posted on the street on which the vehicle is travelling and for reporting the specification conditions to the pertinent customer service organization, said apparatus comprising:

a GPS navigation computer including:

a GPS associated memory unit, and port for downloading data into said memory unit for original installation and for updating and changes; and a GPS transmitting means;

a GPS receiver;

a location-speed relational map database, wherein said location-speed relational map database is stored in said GPS memory unit;

a database processing facility, wherein said database processing facility is connected to said GPS microprocessor and is connected to said port for downloading map data; said database processing facility comprising:

a plurality of specialized databases that include relational data expressed in earth navigation format and data for relational access that is in a latitude and longitude format;

an indexer connected to said specialized databases for selecting access to a particular one of said databases according to the position descriptor related in said database to the vehicle location;

a vehicle engine computer connected to said GPS navigation computer;

a speed sensor and a heading sensor, said sensors being connected to the vehicle odometer for reading speed and heading of the vehicle, said sensors being connected to said GPS computer and to said vehicle engine computer for transmitting the reading of speed and heading of the vehicle;

a vehicle display of an electronic map, wherein said display is connected with said GPS computer for electronically displaying the map with the posted speed limit, the current location of the vehicle on the map and the current speed of the vehicle;

wherein said database processing facility includes a local processing facility;

and wherein said GPS computer determines location, speed and bearing of the vehicle and transmits said data to said local database processing facility;

and wherein said local data processing facility matches location and bearing of the vehicle with the maximum posted speed for said map location;

and wherein said GPS computer is adapted for downloading the vehicle and map data from said local data processing facility to said download port for storing said data in said memory unit;

and wherein said GPS computer forwards the maximum speed limit to said engine computer;

and wherein said engine computer uses the speed limit information contained in said map database to limit the maximum ground speed of the vehicle;

and wherein said engine computer or said GPS computer is adapted to use said GPS transmitting means as a wireless communication link to report the location and speed of the vehicle and the maximum speed limit for the vehicle location to the customer organization.

23. A method for controlling the maximum speed of a vehicle based on the speed limits posted on the street on which the vehicle is travelling; said method employing an apparatus comprising: a GPS receiver; a GPS navigation computer including a GPS associated memory unit, a port for downloading data into said memory unit, and a GPS receiving and transmitting means; a location-speed relational map database being stored in said GPS memory unit; a remote database processing facility comprising a plurality of specialized databases, an indexer connected to said specialized databases for selecting access to a particular one of said databases according to the position descriptor related in said database to the vehicle location, and a receiving and transmitting means; a vehicle engine computer; a speed sensor and a heading sensor; and a vehicle display of an electronic map; said method comprising the steps of:

determining longitude, latitude, speed and bearing data of the vehicle by said GPS computer;

transmitting the position, speed and bearing data of the vehicle to said remote database processing facility by using said GPS transmitting means;

receiving the vehicle position, speed and bearing data by said remote database processing facility employing said receiving means;

processing the position, speed and bearing data by said remote database processing facility to obtain the map location of the vehicle;

determining said location-speed relational map database including the maximum speed corresponding to the location of the vehicle by said processing facility;

transmitting the map and vehicle data corresponding to the position, speed and bearing data of the vehicle by said transmitting means of said database processing facility;

receiving the map and vehicle data including the maximum speed for the vehicle location from said remote database processing facility by said GPS receiving means;

downloading said location-speed relational map database to said download port;

determining what street the vehicle is on and what is the maximum speed limit for that street;

forwarding the maximum speed limit to said engine computer by said GPS computer; and using the speed limit information contained in said location-speed relational map database by said engine computer to limit the maximum ground speed of the vehicle.

24. The method of claim 23 further comprising a step of reporting the location, speed of the vehicle and the maximum posted speed to the customer service organization by using said GPS transmitting means.

25. A method for controlling the maximum speed of a vehicle based on the speed limits posted on the street on which the vehicle is travelling; said method employing an apparatus comprising: a GPS receiver; a GPS navigation computer including a GPS associated memory unit, and a port for downloading data into said memory unit, and a GPS transmitting and receiving means; a location-speed relational map database stored in said GPS memory unit; a local database processing facility comprising a plurality of specialized databases, and an indexer connected to said specialized databases for selecting access to a particular one of said databases according to the position descriptor related in said database to the vehicle location; a vehicle engine computer; a speed sensor and a heading sensor; and a vehicle display of an electronic map; said method comprising the steps of:

determining the position, speed and bearing data of the vehicle by using said GPS computer;

transmitting the position, speed and bearing data of the vehicle to said local database processing facility;

processing the position, speed and bearing data by said local database processing facility to obtain the map location of the vehicle;

determining said location-speed relational map database including the maximum speed corresponding to the location of the vehicle by said processing facility;

downloading the map and vehicle data to said download port;

storing the map and vehicle data in said memory unit, including speed of the vehicle, what street the vehicle is on and what is the maximum speed limit for that street;

forwarding the maximum speed limit to said engine computer by said GPS computer; and using the map data by said engine computer to limit the maximum ground speed of the vehicle.

26. The method of claim 25 further comprising a step of reporting the vehicle speed, location and maximum posted speed to the customer service organization using said GPS transmitting means.

* * * * *